US012257805B2

(12) United States Patent
Kempka, Jr.

(10) Patent No.: US 12,257,805 B2
(45) Date of Patent: Mar. 25, 2025

(54) SPOT PRESSER ASSEMBLY

(71) Applicant: Blanking Systems, Inc., Grafton, WI (US)

(72) Inventor: Russell A. Kempka, Jr., Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 119 days.

(21) Appl. No.: 18/098,429

(22) Filed: Jan. 18, 2023

(65) Prior Publication Data

US 2024/0239077 A1 Jul. 18, 2024

(51) Int. Cl.
*B31B 50/14* (2017.01)
*B31B 50/20* (2017.01)

(52) U.S. Cl.
CPC ............ *B31B 50/142* (2017.08); *B31B 50/20* (2017.08)

(58) Field of Classification Search
CPC .............................. B31B 50/142; B31B 50/20
See application file for complete search history.

(56) References Cited

U.S. PATENT DOCUMENTS 707,803 A 8/1902 Smith
1,071,959 A 9/1913 Schoenfeld
1,397,617 A * 11/1921 Belden ...................... B67B 3/12 53/368
1,414,354 A 5/1922 Gibbs
1,911,742 A * 5/1933 Berry ................... B26D 7/1818 408/98
2,173,122 A * 9/1939 Mancuso .................. B67B 5/00 53/344
2,241,711 A * 5/1941 Lowey .................. B65B 7/2878 53/329.2
2,413,999 A 1/1947 Shaner
2,558,456 A 6/1951 Palmer
2,655,081 A 10/1953 Burger
2,768,560 A * 10/1956 Hirson ................... B31D 1/025 493/364
2,771,292 A 11/1956 Emerson
2,811,002 A * 10/1957 Dimond .................... B67B 3/14 53/342
3,049,060 A 8/1962 Vahle
3,153,755 A 10/1964 Nestler et al.
3,163,095 A * 12/1964 Sheeran .................. B31B 50/00 83/454
3,198,091 A 8/1965 Fahey
3,228,659 A 1/1966 Sturm
(Continued)

FOREIGN PATENT DOCUMENTS

CA 593131 2/1960
CH A53131 11/1977
(Continued)

*Primary Examiner* — Thomas M Wittenschlaeger
*Assistant Examiner* — Katie L Gerth
(74) *Attorney, Agent, or Firm* — Boyle Fredrickson, S.C.

(57) ABSTRACT

A spot presser assembly is provided for supporting carton blanking scrap. The spot presser assembly includes an intermediate plunger telescopically received in a housing and a presser plunger telescopically received in the intermediate plunger. A first spring biases the intermediate plunger toward its extended position and a second spring biases the presser plunger toward its extended position.

18 Claims, 6 Drawing Sheets

(56) References Cited

U.S. PATENT DOCUMENTS 3,278,985 A * 10/1966 Everett .................. B29C 43/18 425/127
3,465,634 A * 9/1969 Blais .................... B26D 7/1818 83/695
3,493,995 A * 2/1970 Green .................... B21D 51/46 425/809
3,584,661 A * 6/1971 Riesenberg ............. B65B 31/00 141/63
3,672,121 A * 6/1972 Kawaminani ............. B65B 7/28 53/351
3,794,228 A 2/1974 Colwill
3,827,843 A * 8/1974 Blouch ................... B29C 70/80 425/127
3,952,633 A 4/1976 Nakai
3,952,634 A 4/1976 Rollins et al.
3,964,655 A 6/1976 Kotaro
4,025,053 A 5/1977 Stickle, Jr.
4,171,081 A 10/1979 Vossen et al.
4,205,502 A * 6/1980 Ahlers ...................... B67B 3/12 53/367
4,243,166 A 1/1981 Vossen et al.
4,247,241 A * 1/1981 Warren ................... B65B 23/06 414/416.05
4,248,370 A 2/1981 Schroter
4,452,595 A 6/1984 Huff
4,488,466 A 12/1984 Jones
4,493,234 A 1/1985 Ziegler
4,500,306 A 2/1985 Nowacki
4,562,685 A * 1/1986 Tomita ...................... B67B 3/14 53/353
4,613,122 A 9/1986 Manabe
1,044,239 A 1/1988 Seybold
4,767,482 A 8/1988 Diez
4,771,588 A * 9/1988 Lofgren .................... B67B 3/14 53/353
4,858,888 A 8/1989 Cruz et al.
4,921,154 A 5/1990 Abe et al.
5,065,926 A * 11/1991 Yerly ................... B26D 7/1818 225/93
5,087,236 A 2/1992 Morimoto
5,150,558 A * 9/1992 Bernhard .................. B67B 3/02 53/167
5,192,053 A 3/1993 Sehlstedt
5,222,717 A 6/1993 Traficant
5,474,219 A 12/1995 Mano
5,494,553 A 2/1996 Colucci
5,529,565 A * 6/1996 Oetlinger ............. B26D 7/1818 225/105
5,599,269 A * 2/1997 Oetlinger ............. B26D 7/1818 493/82
5,766,123 A * 6/1998 Oetlinger ............... B26D 7/025 225/96
5,810,233 A 9/1998 Varidel
5,971,378 A 10/1999 Sweeney
6,007,315 A * 12/1999 Busacchi .............. B29C 31/041 425/127
6,062,638 A 5/2000 Ferguson
6,213,451 B1 4/2001 Finkbeiner
6,572,522 B1 * 6/2003 Shimer ................ B26D 7/1818 493/114
6,655,115 B1 * 12/2003 Zurlinden ................. B67B 5/03 53/328
6,659,927 B2 12/2003 Myers et al.
6,692,425 B2 2/2004 Myers et al.
6,966,873 B2 11/2005 Oetlinger
7,021,208 B2 4/2006 Du et al.
7,128,703 B2 10/2006 Oetlinger
7,171,885 B1 2/2007 Obiol
7,341,551 B2 3/2008 Oetlinger
8,770,103 B2 7/2014 Kempka, Jr.
8,979,723 B2 * 3/2015 Tarka ................... B26D 7/1818 493/82
9,579,816 B2 2/2017 Kempka, Jr.
11,420,355 B2 * 8/2022 González .................. B26F 1/40
2002/0160898 A1 10/2002 Myers et al.
2002/0160899 A1 10/2002 Myers et al.
2005/0145116 A1 7/2005 Oetlinger
2010/0301088 A1 12/2010 Purdy et al.
2011/0132956 A1 * 6/2011 Kempka, Jr. ........ B26D 7/1818 225/2
2012/0088644 A1 * 4/2012 Tarka ................... B26D 7/1818 493/82
2013/0181027 A1 * 7/2013 Kempka, Jr. ........... B23P 11/00 225/103
2019/0071199 A1 * 3/2019 Cassoli ................. B65B 59/003
2020/0198819 A1 * 6/2020 Wang ...................... B65B 61/06

FOREIGN PATENT DOCUMENTS

| | | |
|---|---|---|
| CN | 108746324 | 11/2018 |
| DE | 419900 | 10/1925 |
| DE | 2022951 | 1/1971 |
| DE | 2825631 | 1/1979 |
| DE | 3033648 | 4/1982 |
| EP | 0391299 | 10/1990 |
| FR | 2682633 | 10/1991 |
| JP | 2001038692 | 2/2001 |
| SE | 393061 | 8/1974 |
| SU | 286335 | 1/1968 |

* cited by examiner

SPOT PRESSER ASSEMBLY

FIELD OF THE INVENTION

This invention relates generally to blanking operations, and in particular, to a spot presser assembly for supporting carton blanking scrap during a blanking operation.

BACKGROUND AND SUMMARY OF THE INVENTION

In the manufacture of cartons, small sheets of paper material having specific profiles are cut out of larger sheets of paper material. These smaller sheets are known as carton blanks which, in turn, are formed into cartons and/or boxes. The blanks are formed during a process known as a blanking operation in a die cutting machine. More specifically, in a die cutting machine, the blanks are cut, but not removed from a large sheet of paper material. After the blanks have been cut, the sheet is moved downstream in the die cutting machine to a blanking station wherein the sheet is positioned over a frame for support. The frame includes large openings which correspond in size, in shape and in position to the profile of the carton blank previously cut. Below the frame is a mechanism for stacking the carton blanks.

At the blanking station, an upper tool is used in combination with the lower tool or frame to knock the carton blanks from the sheet of paper material while holding the scrap material that surrounds the blanks. The upper tool has a support board that moves vertically up and down in the die cutting machine, and the support board typically has a plurality of stand-offs depending therefrom that hold pushers spaced beneath the board which in turn are used to push the carton blanks from the sheet through the lower tool or frame. A plurality of presser assemblies are also mounted in the support board and depend therefrom to hold the scrap material against the lower tool or frame during the blanking operation so that the blanks may be pushed from the sheet. A presser assembly typically includes an engagement member, such as a presser rail or a foot, which is biased downwardly away from the support board by a spring so to be positioned slightly below the pushers. As the upper tool is lowered, the engagement member engages the sheet of paper material first such that a scrap portion of the large sheet of material is secured between the engagement member and the frame. The upper tool then continues to be lowered such that the pushers engage the carton blanks and knock the blanks out of the sheet of material. The carton blank then falls into a stacking mechanism below the frame, allowing the blanks to be stacked for further processing.

In order to securely hold the carton blank scrap, the engagement members are interconnected to the support board by a plurality of guide cylinders. Each guide cylinder biases the engagement member downwardly away from the support board. By way of example, Oetlinger, U.S. Pat. No. 5,766,123 discloses a presser assembly is provided for supporting carton blanking scrap during a blanking operation. The presser assembly includes a presser rail having a first end mounted to a guide cylinder and a second end mounted to a second guide cylinder such that each end of the presser rail is vertically movable independent of the opposite end. This, in turn, prevents jamming of the presser assembly during the blanking operation.

While functional for its intended purpose, it is noted that presser assembly disclosed in the ’123 patent has certain disadvantages. For example, the guide cylinder is mounted to the support board such that the upper end thereof projects upwardly from the board. However, it is desirable to eliminate any components projecting above the support board and instead provide flush mounted presser assemblies for at least two reasons. First, for tool storage purposes an upper tool having flush mounted pressers takes up less space. This is particularly advantageous in locations where storage space is at a premium. Secondly, many die cutting machines are built in such a manner that the upper tool slides into the blanking station of the machine. Any component projecting upwardly of the support board could potentially interfere with such sliding action. Therefore, it is preferable for flush mounted presser assemblies to be used with such systems.

Further, the guide cylinder in the presser assembly disclosed in the ’123 patent includes a single spring arranged about a stem which engages a bushing within the housing of the guide cylinder so as to bias the engagement member rail away from the support board. During a blanking operation, the compression force on the spring often exceeds the spring’s elastic limit. As a result, over time, the spring within the guide cylinder of the presser assembly becomes deformed and wears out, thereby causing the spring, and hence, the presser assembly to fail. Therefore, it is highly desirable to provide a presser assembly which is more durable and will withstand more blanking operations than prior presser assemblies.

Therefore, it is a primary object and feature of this invention to provide a spot presser assembly which is more durable and can withstand blanking operations over an extended period of time than prior presser assemblies.

It is a further primary object and feature of this invention to provide a spot presser assembly having an engagement member which securely holds carton blanking scrap during a blanking operation.

It is still a further object and feature of the present invention to provide a spot presser assembly which is easy to assemble and easy to mount to standard support member of a blanking tool assembly.

In accordance with the present invention, a spot presser assembly is provided for supporting carton blanking scrap. The sport presser assembly includes a housing including a cavity formed therein. The housing has a closed end and an open end communicating with the cavity. An intermediate plunger is telescopically received in the housing. The intermediate plunger has a passage extending therethrough and is slidable between a first retracted position wherein the intermediate plunger is at least substantially received with the cavity in the housing and an extended position wherein the intermediate plunger projects from the open end of the housing. A presser plunger is telescopically received in the passage of the intermediate plunger. The presser plunger is slidable between a retracted position wherein the presser plunger is at least substantially received with the passage of the intermediate plunger and an extended position wherein the presser plunger projects from the passage of the intermediate plunger. A first biasing structure urges the intermediate plunger toward the extended position. A second biasing structure urges the presser plunger toward the extended position.

A foot may be operatively connected to the presser plunger. The first and second biasing structures may include springs. The spring of the first biasing structure has a first end abutting the closed end of the housing and a second end operatively engaged with the intermediate plunger. The spring of the second biasing structure has a first end operatively engaged with intermediate plunger and a second end operatively engaged with the presser plunger. The springs of the first and second biasing structures are concentric with the intermediate plunger and the presser plunger in the retracted positions.

The housing includes an inner surface defining the cavity and the intermediate plunger has an outer surface forming a slidable interface with the inner surface of the inner surface of the housing. One of the inner surface of the housing and the outer surface of the intermediate plunger includes a guide projecting therefrom and the other of the inner surface of the housing and the outer surface of the intermediate plunger including a guide slot. The guide and guide slot are configured to guide slidable movement of the intermediate plunger between the retracted and the extended positions. The intermediate plunger includes an inner surface defining the passage. The presser plunger has an outer surface forming a slidable interface with the inner surface of the intermediate plunger. One of the inner surface of the intermediate plunger and the outer surface of the presser plunger includes a guide projecting therefrom and the other of the inner surface of the intermediate presser and the outer surface of the presser plunger includes a guide slot. The guide and guide slot are configured to guide slidable movement of the presser plunger between the retracted and the extended positions.

In accordance with a further aspect of the present invention, a presser assembly is provided for supporting carton blanking scrap. A housing includes an inner surface defining a cavity, a closed end and an open end communicating with the cavity. An intermediate plunger is telescopically received in the cavity of the housing and being movable between a first retracted position wherein the intermediate plunger is at least substantially received with the cavity in the housing and an extended position wherein the intermediate plunger projects from the open end of the housing. The intermediate plunger has outer and inner walls. The outer wall has an outer surface forming a slidable interface with the inner surface of the housing and an inner surface. An inner wall has an outer surface and an inner surface defining a passage extending through the intermediate plunger. The outer surface of the inner wall and the inner surface of the outer wall defining a spring receipt cavity. A presser plunger is telescopically received in the passage of the intermediate plunger. The presser plunger is slidable between a retracted position wherein the presser plunger is at least substantially received with the passage of the intermediate plunger and an extended position wherein the presser plunger projects from the passage of the intermediate plunger. A first spring has a first end abutting the closed end of the housing and a second end receiving within the spring receipt cavity. The first spring biases the intermediate plunger toward the extended position. A second spring has a first end operatively engaged with intermediate plunger and a second end operatively engaged with the presser plunger. The second spring biases the presser plunger toward the extended position.

A foot may be operatively connected to the presser plunger. The first and second springs are concentric with the intermediate plunger and the presser plunger in the retracted positions. One of the inner surface of the housing and the outer surface of the outer wall of the intermediate plunger include a guide projecting therefrom and the other of the inner surface of the housing and the outer surface of the intermediate plunger include a guide slot. The guide and guide slot are configured to guide slidable movement of the intermediate plunger between the retracted and the extended positions. One of the inner surface of the inner wall of the intermediate plunger and the outer surface of the presser plunger includes a guide projecting therefrom and the other of the inner surface of the inner wall of the intermediate presser and the outer surface of the presser plunger includes a guide slot. The guide and guide slot are configured to guide slidable movement of the presser plunger between the retracted and the extended positions.

In accordance with a further aspect of the present invention, a spot presser assembly is provided supporting carton blanking scrap. The spot presser assembly includes a housing and an intermediate plunger telescopically received in the housing. The intermediate plunger is movable between a retracted position and an extended position. A presser plunger is telescopically received in the intermediate plunger. The presser plunger is movable between a retracted position and an extended position. A first biasing structure biases the intermediate plunger toward the extended position and a second biasing structure biases the presser plunger toward its extended position. The first and second biasing structures are concentric with the intermediate plunger and the presser plunger in the retracted positions.

The housing includes an inner surface defining a cavity, a closed end and an open end communicating with the cavity. The intermediate plunger is receivable in the cavity of the housing. The intermediate plunger includes an outer wall and an inner wall. The outer wall has an outer surface forming a slidable interface with the inner surface of the housing and an inner surface. The inner wall has an outer surface and an inner surface defining a passage extending through the intermediate plunger. The outer surface of the inner wall and the inner surface of the outer wall define a spring receipt cavity. The first biasing structure includes a spring having a first end abutting the closed end of the housing and a second end receiving within the spring receipt cavity. The second biasing structure includes a spring having a first end operatively engaged with intermediate plunger and a second end operatively engaged with the presser plunger.

One of the inner surface of the housing and the outer surface of the outer wall of the intermediate plunger includes a guide projecting therefrom and the other of the inner surface of the housing and the outer surface of the intermediate plunger includes a guide slot. The guide and guide slot are configured to guide slidable movement of the intermediate plunger between the retracted and the extended positions. One of the inner surface of the inner wall of the intermediate plunger and the outer surface of the presser plunger includes a guide projecting therefrom and the other of the inner surface of the inner wall of the intermediate presser and the outer surface of the presser plunger includes a guide slot. The guide and guide slot are configured to guide slidable movement of the presser plunger between the retracted and the extended positions. A foot may be operatively connected to the presser plunger.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
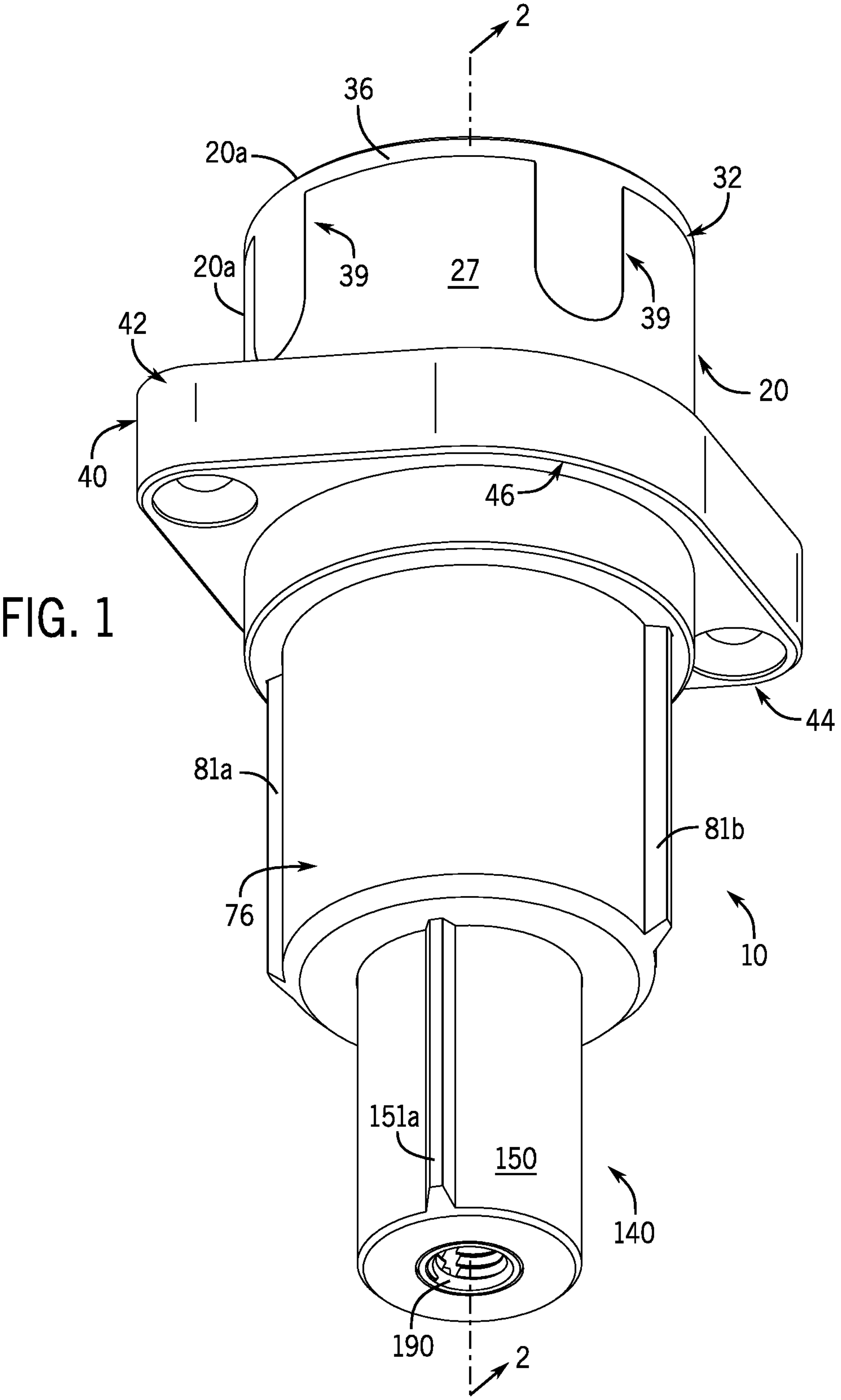
FIG. 1 is an isometric view of a spot presser assembly in accordance with the present invention shown in its extended position.
Figure 4:
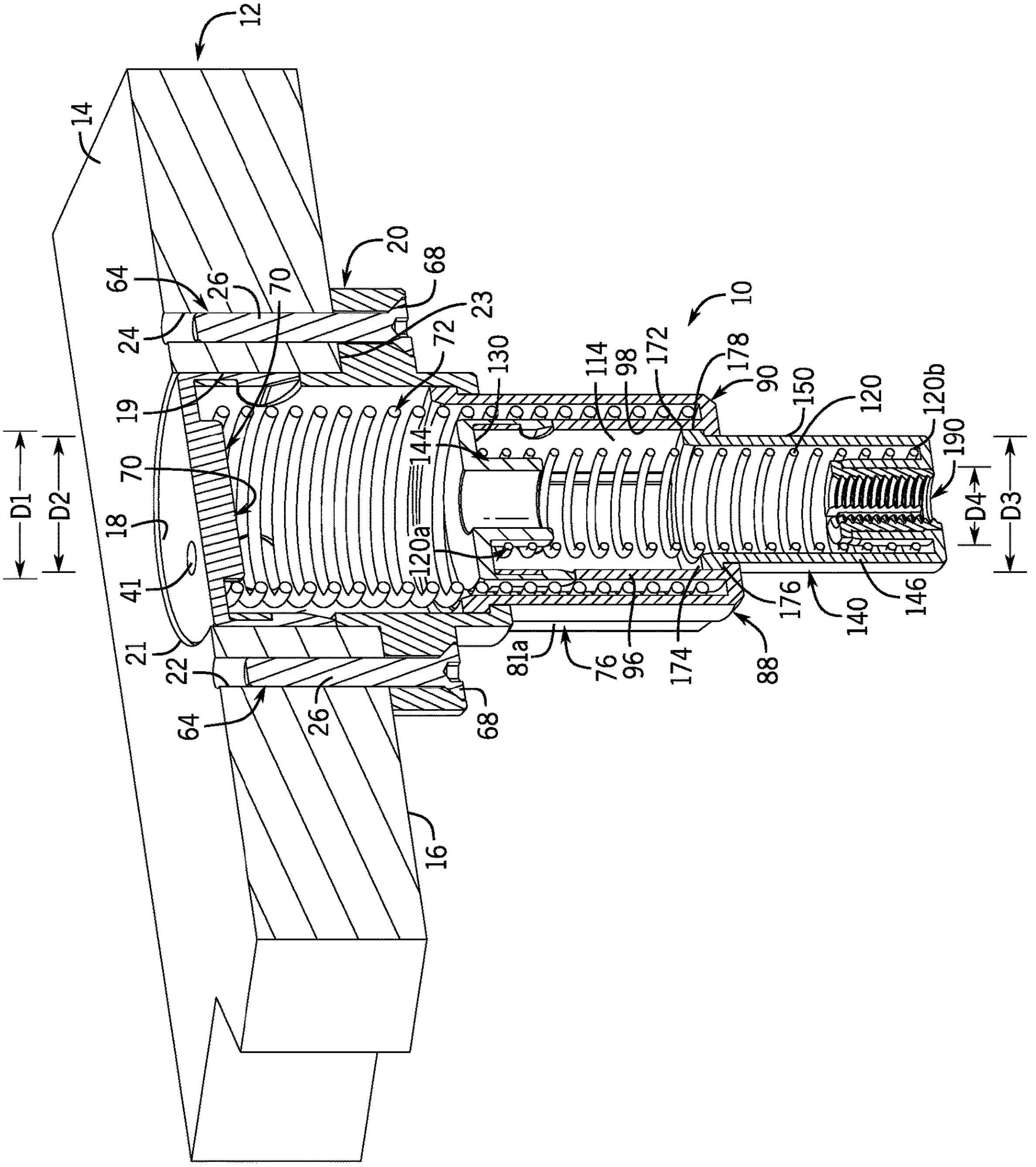
FIG. 4 is a cross-sectional view of the spot presser assembly of the present invention, similar to FIG. 2, wherein the spot presser assembly is mounted within a support member.
Figure 5:
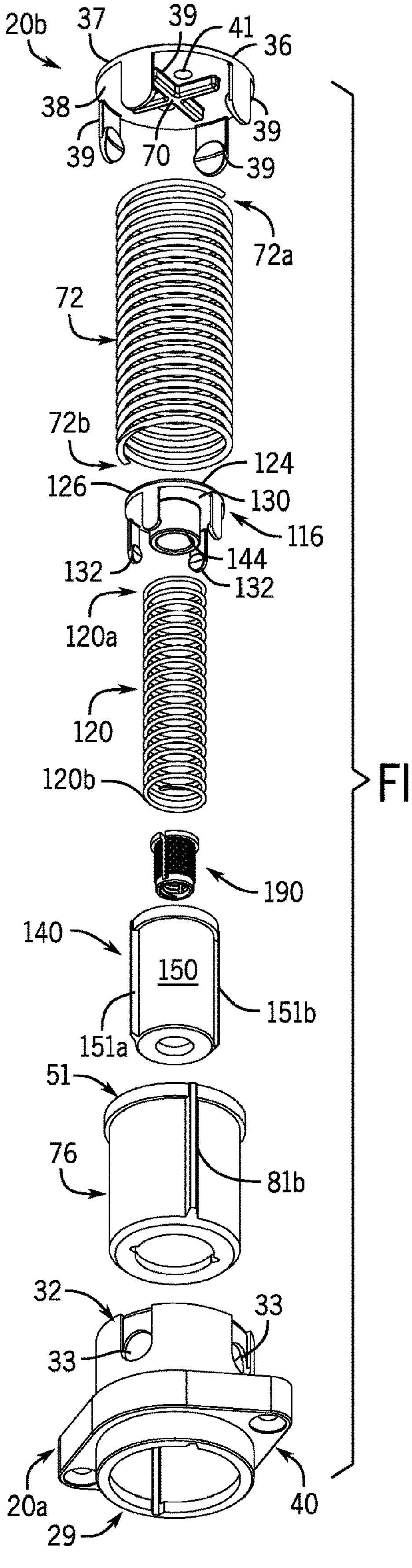
FIG. 5 is an exploded isometric view of the spot presser assembly of the present invention.
Figure 6:
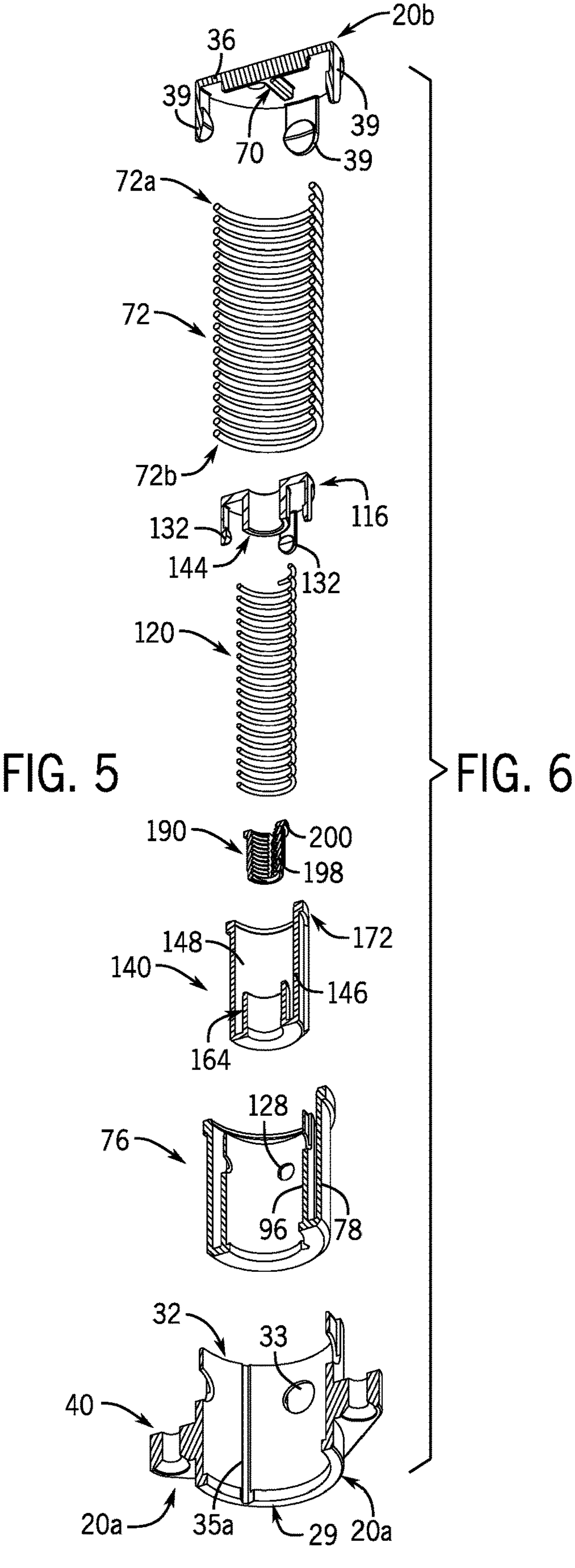
FIG. 6 is an exploded isometric view, similar to FIG. 6, showing the spot presser assembly of the present invention in cross-section.

Referring to FIG. 1, a spot presser assembly in accordance with the present invention is generally designated by the reference number 10. As best seen in FIG. 4, presser assembly 10 is secured to a flat, plate-like support member or board 12 typically composed of a wood material, such as plywood or the like. The dimensions of support member 12 can vary depending upon the dimensions of the sheet of paper material with which it is used and the profile of the carton blank to be produced, as is well known to those skilled in the art. As is conventional, support member 12 moves vertically during a blanking operation.

Support member 12 is defined by a planer upper surface 14 and a planer lower surface 16 lying in corresponding, substantially horizontal planes. Support member 12 includes bore 18 extending between upper and lower surfaces 14 and 16, respectively, along an axis perpendicular thereto. Bore 18 is defined by a generally cylindrical inner surface 19 intersecting upper and lower surfaces 14 and 16, respectively, at corresponding edges 21 and 23, respectively. It is contemplated for edges 21 and 23 to have generally circular configurations. Bore 18 has a diameter of sufficient dimension to accommodate the receipt of housing 20 of presser assembly 10, as hereinafter described. Threaded bores 22 and 24 also extend through support member 12 between upper and lower surfaces 14 and 16, respectively. Threaded bores 22 and 24 are positioned on opposite sides of bore 18 and are intended to receive shafts 26 of corresponding bolts 64, in a mating relationship in order to interconnect housing 20 to support member 12, for reasons hereinafter described.

Referring to FIGS. 1-5, presser assembly 10 includes housing 20 which is mountable to support member 12. Housing 20 may be constructed as a single, integral unit or as two distinct elements 20*a* and 20*b* interconnected to form a single unit. By way of example, housing 20*a* includes a generally cylindrical wall 28 defining a generally cylindrical inner surface 30, a generally cylindrical outer surface 27, a first end 29 and a second end 32. Inner surface 30 of cylindrical wall 28 of housing element 20*a* defines cavity 66 within housing 20 and includes first and second circumferentially spaced, v-shaped grooves 35*a* and 35*b*, respectively, extending axially between first and second ends 30 and 32, respectively, of cylindrical wall 28, for reasons hereinafter described. The outer diameter of cylindrical wall 28 approximates the diameter of bore 18 in support member 12 such that bore 18 accommodates the receipt of housing 20 of presser assembly 10 therein, FIG. 4. A plurality of circumferentially spaced apertures 33 extend through cylindrical wall 28, for reasons hereinafter described.

Shoulder portion 40 extends outwardly from outer surface 34 of housing element 20*a* and includes first arm 42 and second arm 44 interconnected by neck portion 46 extending about outer surface 34. Each of the first and second arms 42 and 44, respectively, are defined by upper surfaces 56 and lower surfaces 58 with are generally parallel to each other. Upper and lower surfaces 56 and 58, respectively, of first and second arms 42 and 44, respectively, are interconnected by circular walls 60 which define bolt passages 62 through first and second arms 42 and 44, respectively. In order to connect housing element 20*a*, and hence housing 20, to support member 12, bolts 64 extend through corresponding bolt passages 62 in first and second arms 42 and 44, respectively, of the housing 34 and into corresponding threaded bores 22 and 24 in support member 12. Bolts 64 include heads 68, FIG. 4, having diameters greater than that of bolt passages 62 in order to prevent housing 20 from sliding axially off bolts 64 when shafts 26 of bolts 64 are threaded into threaded bores 22 and 24 of support member 12.

Housing element 20*b* includes end wall 36 having a plurality of resilient mounting tangs 39, corresponding in the number of apertures 33 extending through cylindrical wall 28 of housing element 20*a*, depending from the outer periphery thereof. Aperture 41 may extend through end wall 36 to allow air to pass therethough during compression of presser assembly 10, as hereinafter described. Tangs 39 are adapted for engagement with corresponding apertures 33 to interconnect housing elements 20*a* and 20*b*. With housing elements 20*a* and 20*b* interconnected, end wall 36 of housing element 20*b* closes second end 32 of cylindrical wall 28. End cap wall 36 is defined by a generally flat first surface 37, directed away from cavity 66 within housing 20 and lying in a plane generally perpendicular to outer surface 27, and a second surface 38, intersecting inner surface 30 of cylindrical wall 28 and directed toward cavity 66 within housing 20.

Spring alignment member 70 projects from second surface 38 of end wall 36 into cavity 66. In the depicted embodiment, spring alignment member 70 is centrally spaced from inner surface 30 of cylindrical wall 28 and has a X-shaped configuration. It is intended for spring alignment member 70 to have a diameter D1 slightly less than inner diameter D2 of first coil spring 72 to allow for first coil spring 72 to be positioned over spring alignment member 70, as hereinafter described. It can be appreciated that spring alignment member 70 may have other configurations, e.g. disc-shaped, without deviating from the scope of the present invention.

Flange 43 projects radially inward from inner surface 30 of cylindrical wall 28 of housing 20*a* adjacent second end 32 thereof. Flange 43 includes a generally flat first surface 45 extending radially inward from and intersecting inner surface 30 of cylindrical wall 28 and a second surface 47 extending radially inward from and intersecting outer surface 27 of cylindrical wall 28. Flange 43 includes a radially inner edge 49 which forms a slidable interface with outer surface 84 of cylindrical outer wall 78 of intermediate plunger 76, as hereinafter described. It can be understood that first surface 45 of flange 43 acts a stop to limit travel and maintain the telescopic arrangement of intermediate plunger 76 within housing 20.

Presser assembly 10 further includes intermediate plunger 76 telescopically received within cavity 66 of housing 20. Intermediate plunger 76 is defined by a generally cylindrical outer wall 78 defining a generally cylindrical inner surface 80, a generally cylindrical outer surface 84, and first and second opposite ends 86 and 88, respectively. As noted above, cylindrical outer wall 78 has a diameter such that outer surface 84 thereof forms a slidable interface with inner edge 49 of flange 43 of housing 20.

Intermediate plunger 76 further includes flange 51 projecting radially outward from outer surface 84 of cylindrical outer wall 78 adjacent first end 86 thereof. Flange 51 includes a generally flat first surface 53 extending radially outward from and intersecting inner surface 80 of cylindrical outer wall 78 and a second surface 55 extending radially outward from and intersecting outer surface 84 of cylindrical outer wall 78. Flange 51 includes a radially outer edge 57 which forms a slidable interface with inner surface 30 of cylindrical wall 28 of housing 20. As noted above, it can be understood that first surface 45 of flange 43 acts as a stop to limit travel and maintain the telescopic arrangement of intermediate plunger 76 within housing 20.

Outer wall 78 has an outer diameter such that outer surface 84 thereof forms a slidable interface with inner edge 49 of flange 43, as heretofore described. Circumferentially spaced ribs 81*a* and 81*b* extend axially along outer surface 84 of outer wall 78 between first and second ends 86 and 88 thereof and is slidably received within corresponding grooves 35*a* and 35*b*, respectively, extending axially along inner surface 30 of cylindrical wall 28 of housing 20 to guide movement of intermediate plunger 76 between its extended, FIGS. 1-2 and 4, and retracted, FIG. 3, positions. End wall 90 extends radially inward from second end 88 of outer wall 78 and includes a radially inner edge 91 defining opening 93 in intermediate plunger 76 having a diameter D3. End wall 90 is defined by a generally flat first surface 92 extending from and lying in a plane generally perpendicular to outer surface 84 of outer wall 78, and a second surface 94 extending from and intersecting inner surface 80 of outer wall 78.

Cylindrical inner wall 96 projects from second surface 94 of end wall 90 and is concentric with outer wall 78. Inner wall 96 includes a generally cylindrical inner surface 98, a generally cylindrical outer surface 100 and a terminal end 102. Lower end 98*a* of inner surface 98 of inner wall 96 is spaced from inner edge 91 of end wall 90 such the portion of second surface 94 of end wall 90 between lower end 98*a* of inner surface 98 of inner wall 96 and inner edge 91 of end wall 90 defines a shoulder 130 for retaining first end 142 of presser plunger 140 within intermediate plunger 76, as hereinafter described. Similarly, outer surface 100 of inner wall 96 intersects second surface 94 of end wall 90 at a location spaced from inner surface 80 of outer wall 78 such that outer surface 100 of inner wall 96 is radially spaced from inner surface 80 of outer wall 78 so as to define spring receipt cavity 104 therebetween for receiving first coil spring 72 therein, as hereinafter described.

More specifically, first end 72*a* of first coil spring 72 is positioned within cavity 66 of housing 20 such that first end 72*a* of first coil spring 72 engages second surface 38 of end wall 36 and the portion of first coil spring 72 adjacent first end 72*a* of first coil spring 72 extends about spring alignment member 70 so as to axially center first coil spring 72 in cavity 66 of housing 20. Second end 72*b* of first coil spring 72 is positioned with spring receipt cavity 104 of intermediate plunger 76 such that second end 72*b* of first coil spring 72 engages second surface 94 of end wall 90 of intermediate plunger 76 and the portion of first coil spring 72 adjacent send end 72*b* of first coil spring extends about the outer surface 100 of inner wall 96 of intermediate plunger 76. As described, first coil spring 72 urges intermediate plunger 76 toward a telescopically extended position, FIGS. 1-2 and 4, projecting from housing 20.

Figure 7:
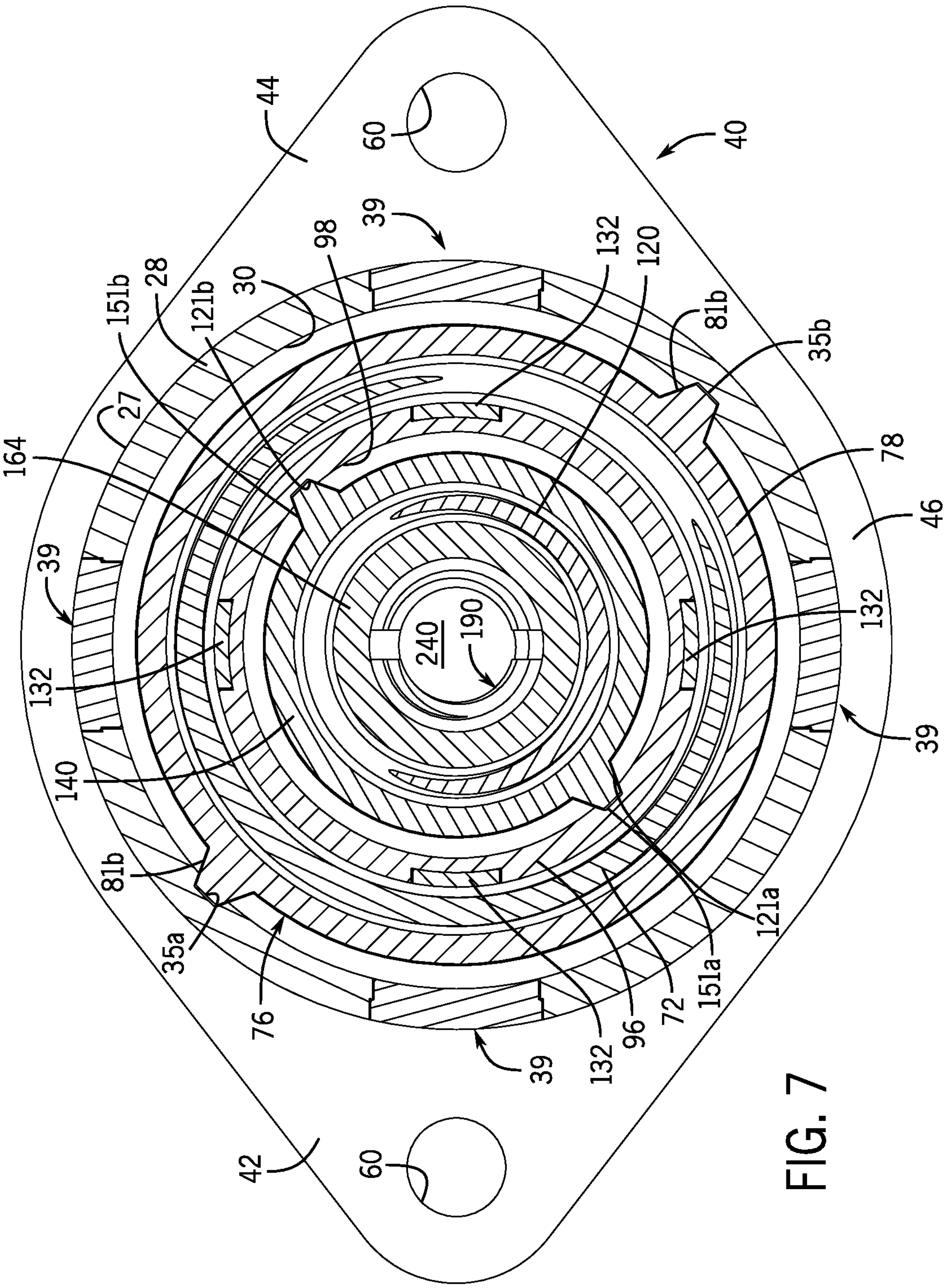
FIG. 7 is a cross-sectional view showing the spot presser assembly of the present invention taken along line 7-7 of FIG. 3.

Inner surface 98 of inner wall 96 of intermediate plunger 76 defines a spring receipt passage 114 therein which is adapted for receipt of second coil spring 120 and includes first and second circumferentially spaced, v-shaped grooves 121*a* and 121*b*, FIG. 7, respectively, extending axially from first surface 92 of end wall 90, through end wall 90 to terminal end 102 of inner wall 98, for reasons hereinafter described. Terminal end 102 of inner wall 96 defines terminal surface 106 lying in a plane spaced from the plane of first surface 53 of flange 51. Terminal surface 106 defines an opening 118 which communicates with spring receipt passage 114.

End cap 116 is provided for closing off opening 118 and retaining a first end 120*a* of second coil spring 120 within intermediate plunger 76. More specifically, end cap 116 includes a generally circular, enlarged head 124 having a radially outer edge 126 which is substantially flush with outer surface 100 of inner wall 96. A plurality of circumferentially spaces tangs 132, FIG. 3, depend from inner surface 130 of end cap 116 at locations inwardly spaced from outer edge 126. It is intended for tangs 132 to engage corresponding circumferentially spaced apertures 128 through inner wall 96 so as to interconnect end cap 116 to inner wall 96, and hence, to intermediate plunger 76.

End cap 116 further includes spring alignment member 144 projecting from second surface 130 of enlarged head 124 into spring receipt passage 114. In the depicted embodiment, spring alignment member 144 is centrally disposed on second surface 130 and has a generally cylindrical configuration. It is intended for spring alignment member 144 to have a diameter slightly less than the inner diameter of second coil spring 120, for reasons hereinafter described. It can be appreciated that spring alignment member 144 may have other configurations, e.g. disc-shaped or X-shaped, without deviating from the scope of the present invention.

Presser plunger 140 is telescopically receivable in intermediate plunger 76 and includes a generally cylindrical wall 146 defining a generally cylindrical inner surface 148, a generally cylindrical outer surface 150, and first and second ends 142 and 154, respectively. Inner surface 148 of cylindrical wall 146 defines spring receipt cavity 166 within presser plunger 140. Cylindrical wall 146 has a diameter such that outer surface 150 thereof forms a slidable interface with inner edge 91 of end wall 90 in intermediate plunger 76. Circumferentially spaced ribs 151*a* and 151*b* extend axially along outer surface 150 of cylindrical wall 146 between first and second ends 142 and 154 thereof and is slidably received within corresponding grooves 121*a* and 121*b*, respectively, extending axially along inner surface 98 of inner wall 96 of intermediate plunger 76 to guide movement of presser plunger 140 between its extended, FIGS. 1-2 and 4, and retracted, FIG. 3, positions.

End wall 156 is provided at second end 154 of cylindrical wall 146. End wall 156 is defined a generally flat first surface 158 extending radially inward from and lying in a plane generally perpendicular to outer surface 150 of cylindrical wall 146 and a second surface 160 extending radially inward from and intersecting inner surface 148. End wall 156 includes a radially inner edge 162 defining opening 164.

Spring alignment member 164 projects from second surface 160 of end wall 124 into spring receipt passage 166 and includes inner surface 168, outer surface 169, and a terminal end 171. In the depicted embodiment, spring alignment member 164 is centrally disposed on second surface 160 and has a generally cylindrical configuration. Inner surface 168 of spring alignment member 164 is coincident with inner edge 160 in end wall 156 and defines a passageway 170 in communication with opening 162 in end wall 156 and with spring receipt cavity 166. It is intended for spring alignment member 164 to have a diameter D4 slightly less than the inner diameter of second coil spring 120, for reasons hereinafter described. It can be appreciated that spring alignment member 164 may have other configurations, e.g. disc-shaped or X-shaped, without deviating from the scope of the present invention.

Insert 190 is receivable in passageway 170 of spring alignment member 164. More specifically, insert 190 includes a generally cylindrical wall 192 defining a generally cylindrical inner threaded surface 194 defining a passageway 204 therethrough, a generally cylindrical outer surface 196, and first and second ends 198 and 200, respectively. When pressed into passageway 170 of spring alignment member 164, cylindrical wall 192 has a diameter such that outer surface 196 engages inner surface 168 of spring alignment member 164 and is frictionally retained in passageway 170 of spring alignment member 164.

Insert 190 further includes flange 204 projecting radially outward from outer surface 196 of cylindrical wall 192 adjacent second end 200 thereof. Flange 204 includes a generally flat first surface 206 extending radially outward from and intersecting inner surface 194 of cylindrical wall 192 and a second surface 208 extending radially outward from and intersecting outer surface 196 of cylindrical wall 192. Flange 204 includes a radially outer edge 210 interconnecting first and second surfaces 206 and 208, respectively. With insert 190 pressed into passageway 170 of spring alignment member 164, second surface 208 of flange 204 is in engagement with terminal end 171 and radially outer edge 210 of flange 204 is concentric with outer surface 169. It is contemplated interconnect a resilient foot or the like to insert 190, and hence, presser assembly 10. By way of example, the foot may include a body portion having a neck projecting therefrom. The neck of the foot may be threaded into inner threaded surface 194 of insert 190 to interconnect the foot to presser plunger 140.

Presser plunger 140 further includes flange 172 projecting radially outward from outer surface 150 of cylindrical wall 146 adjacent second end 154 thereof. Flange 172 includes a generally flat first surface 174 extending radially outward from and intersecting inner surface 148 of cylindrical wall 146 and a second surface 176 extending radially outward from and intersecting outer surface 150 of cylindrical wall 146. Flange 172 includes a radially outer edge 178 which forms a slidable interface with inner surface 98 of inner wall 96 of intermediate plunger 76. It can be understood that second surface 176 of flange 146 acts a stop to limit travel and maintain the telescopic arrangement of presser plunger 140 within intermediate plunger 76.

Figure 2:
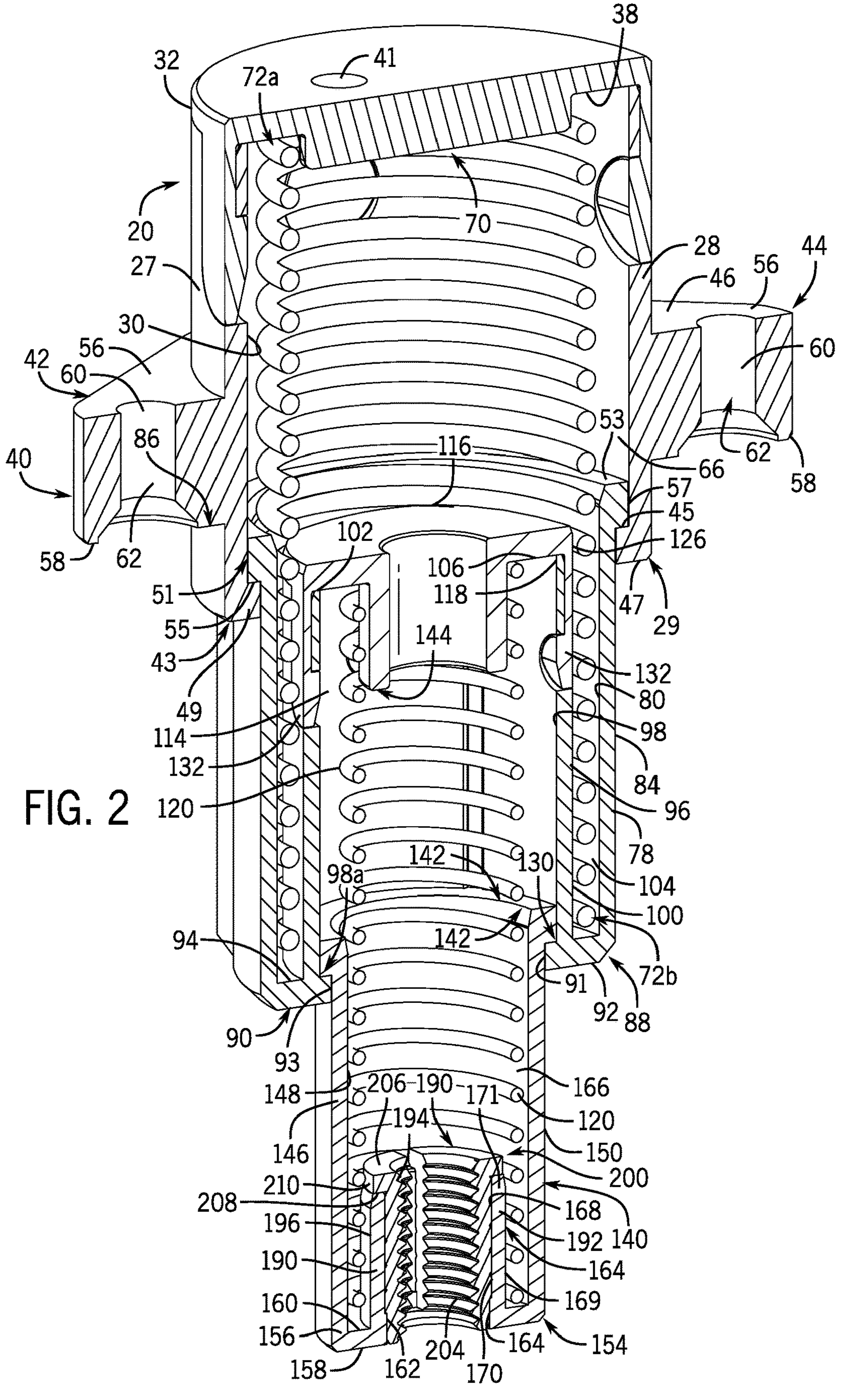
FIG. 2 is a cross-sectional view of the spot presser assembly of the present invention in an extended position taken along line 2-2 of FIG. 1.
Figure 3:
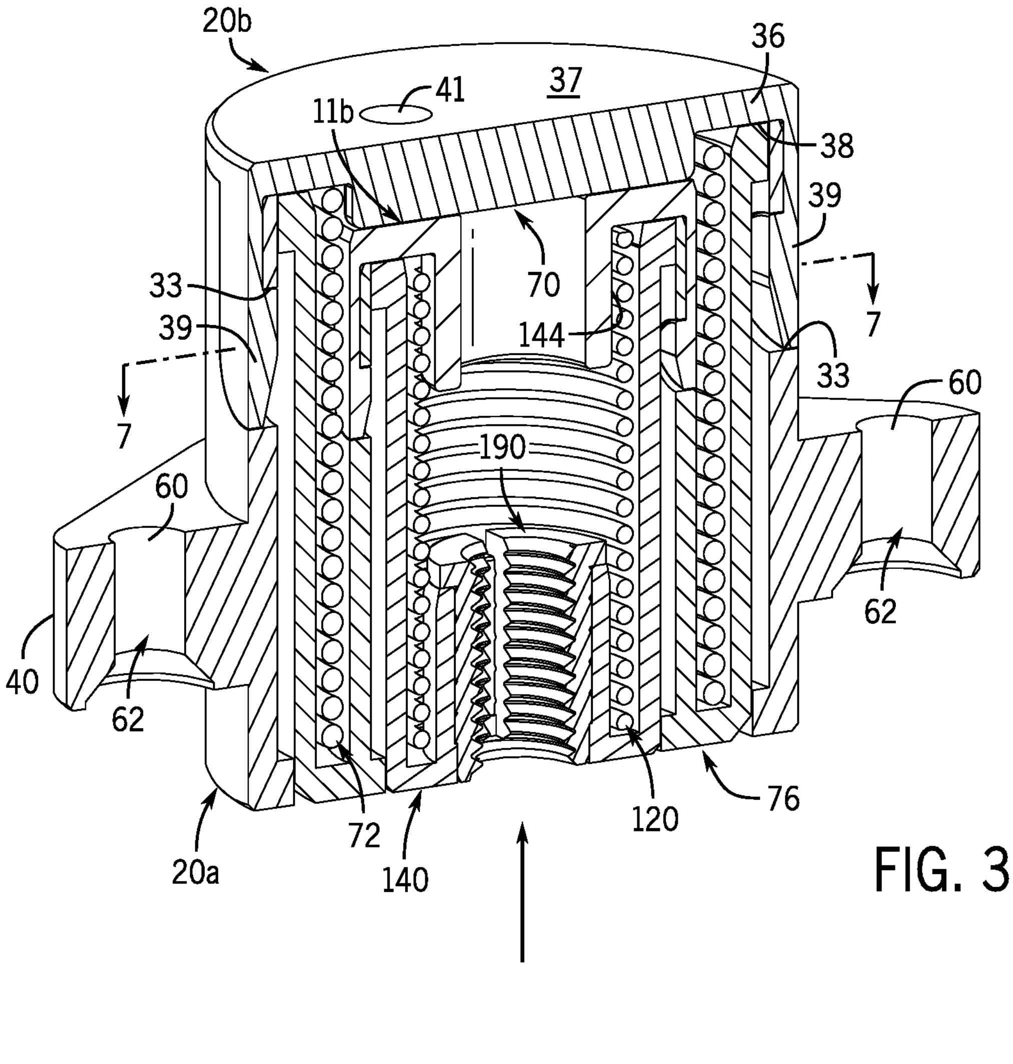
FIG. 3 is a cross-sectional view of the spot presser assembly of the present invention, similar to FIG. 2, showing the presser assembly in a retracted position.

Presser assembly 10 further includes second coil spring 120 for biasing presser plunger 140 to an extended position, FIGS. 1-2 and 4. More specifically, first end 120*a* of second coil spring 120 is positioned within spring receipt passage 114 of intermediate plunger 76 and engages inner surface 130 of enlarged head 124 of end cap 116 and the portion of second coil spring 120 adjacent first end 120*a* of first coil spring 120 extends about spring alignment member 144 so as to axially center second coil spring 120 in spring receipt passage 114 of intermediate plunger 76. Second end 120*b* of second coil spring 120 is positioned with spring receipt cavity 166 of presser plunger 140 such that second end 120*b* of second coil spring 120 engages second surface 160 of end wall 156 of presser plunger 140 and the portion of second coil spring 120 adjacent second end 120*b* of second coil spring 120 extends about spring alignment member 164. As described, second coil spring 120 urges presser plunger 140 to a telescopically extended position, projecting from intermediate plunger 76. As noted above, second surface 176 of flange 146 acts a stop to limit travel and maintain the telescopic arrangement of presser plunger 140 within intermediate plunger 76.

In operation, housing 20 of presser assembly 10 is interconnected to support member 12. Support member 12 is positioned over a blanking tool frame (not shown) supporting a sheet of paper material and intermediate and presser plungers 76 and 140, respectfully, are biased by first and second coil springs 72 and 120, respectively, to their extended positions, FIGS. 1-2 and 4. Support member 12 is lowered in the blanking station, the foot attached to presser assembly 10 engages the upper surface of sheet of paper material 180 and holds it against the blanking tool frame located below the sheet. As support member 12 continues downwardly, presser plunger 140 is urged against the bias of second coil spring 120 into spring receipt passage 114 of intermediate plunger 76 such that first surface 174 of flange 172 travels towards second surface 130 of end cap 116. Simultaneously, intermediate plunger 76 is urged against the bias of first coil spring 72 into cavity 66 of housing 20 such that terminal surface 89 of outer wall 78 of intermediate plunger 76 travels toward second surface 38 of end wall 36 of housing 20. The simultaneous compression of first and second coil springs 72 and 120, respectively, limits the deformation and decreases the propensity of first and second coil springs 72 and 120, respectively, to fail. Support member 12 continues downwardly until presser plunger 140 is fully received within spring receipt passage 114 of intermediate plunger 76; intermediate plunger 76 is fully received within cavity 66 of housing 20; and pushers attached to support member 12 knock out a carton blank from sheet of paper material 180, FIG. 3. As support member 12 is moved back upwardly to its initial starting position, first and second coil springs 72 and 120, respectively, urge intermediate plunger 76 and presser plunger 140 to their extended positions, wherein the process may be repeated.

It can be appreciated that various modes of carrying out the invention are contemplated as being within the scope of the following claims particularly pointing out and distinctly claiming the subject matter, which is regarded as the invention.

I claim:

1. A spot presser assembly for supporting carton blanking scrap, comprising:

- a housing including an inner surface defining a cavity therein, the housing having a closed end and an open end communicating with the cavity;
- an intermediate plunger telescopically received in the housing, the intermediate plunger having:
  - an inner wall defining a passage extending therethrough; and
  - an outer wall radially spaced from the inner wall and having an outer surface forming a slidable interface with the inner surface of the housing, the inner and outer walls defining a biasing structure receipt cavity therebetween, wherein the intermediate plunger is slidable between a first retracted position wherein the intermediate plunger is at least substantially received with the cavity in the housing and an extended position wherein the intermediate plunger projects from the open end of the housing;
- a presser plunger telescopically received in the passage of the intermediate plunger, the presser plunger having an inner surface defining a spring receipt passage, the presser plunger being slidable between a retracted position wherein the presser plunger is at least substantially received with the passage of the intermediate plunger and an extended position wherein the presser plunger projects from the passage of the intermediate plunger;

a first biasing structure having a first end received in the cavity of the housing and a second end received within the biasing structure receipt cavity of the intermediate plunger, the first biasing structure urging the intermediate plunger toward the extended position; and a second biasing structure having a first end received in the passage of the intermediate plunger and a second end received within the spring receipt passage of the presser plunger, the second biasing structure urging the presser plunger toward the extended position.

2. The spot presser assembly of claim 1, further comprising a foot operatively connected to the presser plunger.

3. The spot presser assembly of claim 1, wherein the first and second biasing structures are springs.

4. The spot presser assembly of claim 1, wherein the springs of the first and second biasing structures are concentric with the intermediate plunger and the presser plunger in their retracted positions.

5. The spot presser assembly of claim 1, wherein:

the housing includes an inner surface defining the cavity;

the intermediate plunger having an outer surface forming a slidable interface with the inner surface of the inner surface of the housing; and one of the inner surface of the housing and the outer surface of the intermediate plunger including a guide projecting therefrom and the other of the inner surface of the housing and the outer surface of the intermediate plunger including a guide slot, the guide and guide slot configured to guide slidable movement of the intermediate plunger between the retracted and the extended positions.

6. The spot presser assembly of claim 1, wherein:

the intermediate plunger includes an inner surface defining the passage;

the presser plunger having an outer surface forming a slidable interface with the inner surface of the intermediate plunger; and one of the inner surface of the intermediate plunger and the outer surface of the presser plunger includes a guide projecting therefrom and the other of the inner surface of the intermediate presser and the outer surface of the presser plunger includes a guide slot, the guide and guide slot configured to guide slidable movement of the presser plunger between the retracted and the extended positions.

7. A presser assembly for supporting carton blanking scrap, comprising:

a housing including an inner surface defining a cavity, a closed end and an open end communicating with the cavity;

an intermediate plunger telescopically received in the cavity of the housing and being movable between a first retracted position wherein the intermediate plunger is at least substantially received with the cavity in the housing and an extended position wherein the intermediate plunger projects from the open end of the housing, the intermediate plunger having:

an outer wall having an outer surface forming a slidable interface with the inner surface of the housing and an inner surface;

an inner wall having an outer surface and an inner surface defining a passage extending through the intermediate plunger, the outer surface of the inner wall and the inner surface of the outer wall being radially spaced and defining a spring receipt cavity therebetween;

a presser plunger telescopically received in the passage of the intermediate plunger, the presser plunger having an inner surface defining a spring receipt passage and an outer surface forming a slidable interface with the inner surface of the inner wall of the intermediate plunger, the presser plunger being slidable between a retracted position wherein the presser plunger is at least substantially received with the passage of the intermediate plunger and an extended position wherein the presser plunger projects from the passage of the intermediate plunger;

a first spring having a first end abutting the closed end of the housing and a second end receiving within the spring receipt cavity, the first spring biasing the intermediate plunger toward the extended position; and a second spring having a first end operatively engaged with the intermediate plunger and a second end received within the spring receipt passage so as to operatively engage the presser plunger, the second spring biasing the presser plunger toward the extended position.

8. The spot presser assembly of claim 7, further comprising a foot operatively connected to the presser plunger.

9. The spot presser assembly of claim 7, wherein the first and second springs are concentric with the intermediate plunger and the presser plunger in the retracted positions.

10. The spot presser assembly of claim 7, wherein one of the inner surface of the housing and the outer surface of the outer wall of the intermediate plunger including a guide projecting therefrom and the other of the inner surface of the housing and the outer surface of the intermediate plunger including a guide slot, the guide and guide slot configured to guide slidable movement of the intermediate plunger between the retracted and the extended positions.

11. The spot presser assembly of claim 7, wherein one of the inner surface of the inner wall of the intermediate plunger and the outer surface of the presser plunger includes a guide projecting therefrom and the other of the inner surface of the inner wall of the intermediate presser and the outer surface of the presser plunger includes a guide slot, the guide and guide slot configured to guide slidable movement of the presser plunger between the retracted and the extended positions.

12. A spot presser assembly supporting carton blanking scrap, comprising:

a housing having an inner surface;

an intermediate plunger telescopically received in the housing, the intermediate plunger:

having an outer wall having an outer surface forming a slidable interface with the inner surface of the housing and an inner surface, and an inner wall having an outer surface and an inner surface defining a passage in the intermediate plunger, the outer surface of the inner wall and the inner surface of the outer wall being radially spaced and defining a spring receipt cavity therebetween; and being movable between a retracted position and an extended position;

a presser plunger telescopically received in the intermediate plunger and having:

an inner surface defining a spring receipt passage; and an outer surface forming a slidable interface with the inner surface of the inner wall of the intermediate plunger, the presser plunger being movable between a retracted position and an extended position;

a first biasing structure having a first end abutting the housing and a second end receiving within the spring receipt cavity, the first biasing structure biasing the intermediate plunger toward the extended position; and a second biasing structure having a first end operatively engaged with the intermediate plunger and a second end received within the spring receipt passage, the second biasing structure biasing the presser plunger toward its the extended position;

wherein the first and second biasing structures are concentric with the intermediate plunger and the presser plunger in the retracted positions.

13. The spot presser assembly of claim 12, wherein the inner surface of the housing defines a cavity, and wherein the housing includes a closed end and an open end communicating with the cavity, the intermediate plunger is receivable in the cavity of the housing.

14. The spot presser assembly of claim 13, wherein the first biasing structure includes a spring having a first end abutting the closed end of the housing and a second end received within the spring receipt cavity.

15. The spot presser assembly of claim 14, wherein the second biasing structure includes a spring having a first end operatively engaged with the intermediate plunger and a second end operatively engaged with the presser plunger.

16. The spot presser assembly of claim 13, wherein one of the inner surface of the housing and the outer surface of the outer wall of the intermediate plunger includes a guide projecting therefrom and the other of the inner surface of the housing and the outer surface of the intermediate plunger includes a guide slot, the guide and guide slot configured to guide slidable movement of the intermediate plunger between the retracted and the extended positions.

17. The spot presser assembly of claim 13, wherein one of the inner surface of the inner wall of the intermediate plunger and the outer surface of the presser plunger includes a guide projecting therefrom and the other of the inner surface of the inner wall of the intermediate presser and the outer surface of the presser plunger includes a guide slot, the guide and guide slot configured to guide slidable movement of the presser plunger between the retracted and the extended positions.

18. The spot presser assembly of claim 12, further comprising a foot operatively connected to the presser plunger.

* * * * *